United States Patent Office 3,247,283
Patented Apr. 19, 1966

1

3,247,283
CURABLE COMPOSITIONS COMPRISING DI-CYCLOPENTADIENE DIOXIDE, DIGLYCID-YL ETHER OF A POLYHYDRIC PHENOL, POLYCARBOXYLIC ACID ANHYDRIDE AND ORGANIC POLYOL AND RESINS MADE THEREFROM
Charles W. McGary, Jr., and Charles T. Patrick, Jr., both of South Charleston, W. Va., assignors to Union Carbide Corporation, a corporation of New York
No Drawing. Filed May 3, 1961, Ser. No. 107,291
16 Claims. (Cl. 260—835)

This invention relates to curable epoxide compositions and resins made therefrom. In one aspect, this invention relates to curable compositions comprising dicyclopentadiene dioxide, polyglycidyl ethers of polyhydric phenols, polycarboxylic acid anhydrides, and polyols, and resins made therefrom.

This application is a continuation-in-part of an application entitled "Curable Epoxy Compositions and Resins Made Therefrom," by C. W. McGary, Jr., and C. T. Patrick, Jr., Serial No. 675,011, filed July 30, 1957, now U.S. Patent 2,985,616. Serial No. 675,011 is itself a continuation-in-part of application Serial No. 629,475, filed December 20, 1956. Both applications are assigned to the same assignee as the instant invention.

Our resins are tough and water resistant. They can be made as hard, rigid, infusible products; as soft, flexible, infusible products or as products having intermediate degrees of hardness and rigidity or softness and flexibility, as desired. They can be produced with excellent high temperature load carrying capabilities as measured by heat distortion values which in certain of our resins reach as high as 300° C. Certain of our resins also exhibit good strength properties at room temperature and excellent strength properties at elevated temperatures. In particular, glass cloth laminates of these resins possess excellent flexural strength.

Our curable compositions at room temperature range from low viscosity liquids to solids, which are easily handled and can be easily polymerized by maintaining the composition at an elevated temperature for a period of time. The solid compositons are particulirly valuable as molding powders and as laminating powders for such applications as preloading glass cloth. The preloaded glass cloth may then be laminated in the usual manner to produce glass laminates with outstanding strengths. By elevating the temperature of our solid compositions, low viscosity, curable, liquid compositions are obtained. These liquid compositions have pot-lives of sufficient duration to permit the addition of fillers and pigments to alter the physical characteristics and appearance, respectively, of our resins. With or without fillers and pigments the liquid compositions are readily pourable and are capable of flowing into intricate corners of molds so that accurately molded articles results. The liquid compositions also can be flowed, sprayed or spread on surfaces and cured to provide durable, protective finishes thereto. They may be similarly applied to sheets of material for making laminates. In this connection the liquid compositions have been found to exhibit excellent wettability towards a large variety of materials, such as, glass and metals. Our curable compositions whether liquid or solid, are also soluble in many organic solvents, such as acetone, butyl acetate, toluene, ethyl acetate, methyl isobutyl ketone,

2 xylene and the like. Solutions thus formed can be flowed, sprayed or spread on surfaces, the solvent driven off and the composition cured to provide durable coatings. Our compositions also can be partially cured to solid resins, ground or granulated and employed as molding or laminating materials.

Many unique and unexpected properties are exhibited by the curable compositions and resins of the instant invention. For example, it has been found that the novel compositions containing each of the components hereinafter described, can be conveniently cured to rigid or flexible resins having excellent color and which are free of air bubbles. Additionally, the melt temperature of the curable compositions is sufficiently low to permit resin formation by the usual procedures. In contrast, the omission of but one component of the curable composition, for instance, the polyol or anhydride, resulted in resins which were crazed, full of air bubbles, and had poor color. Moreover, it was virtually impossible to prepare resins from such compositions by the usual techniques. It was thus evident that the presence of each of the components was necessary to prepare the novel compositions and resins of this invention.

The curable compositions of this invention can be advantageously made by mixing dicyclopentadiene dioxide, a polyglycidyl ether of polyhydric phenol, a polycarboxylic acid anhydride, and a polyol. Dicyclopentadiene dioxide is a crystalline solid and can be readily dissolved by many solvents including liquid polycarboxylic acid anhydrides and polyols at temperatures well below its melting point. The compositions can be prepared in any suitable manner as by mechanically mixing the liquid or solid forms of dicyclopentadiene dioxide with the liquid or solid forms of the polyglycidyl ether, polycarboxylic acid anhydride or polyol. It is preferred to form a homogeneous mixture of dicyclopentadiene dioxide, polyglycidyl ether, polycarboxylic acid anhydride and polyol prior to curing. When the polyglycidyl ether, anhydride, or polyol are solids at room temperature, it is advantageous to raise the temperature of the mixture until a solution is formed. When a liquid polyglycidyl ether of a polyhydric phenol, anhydride or polyol is used, it is advantageous to add the solid components to the liquid component and raise the temperature, if necessary, to form a solution. However, any suitable method of sequence of mixing the components can be employed. Temperatures required for forming a solution have been found to vary from 25° C. to 200° C. depending upon the melting point and solubility and solvent characteristics of the particular components employed. Stirring aids the formation of a solution or homogeneous mixture, although it may not be necessary. After all of the composition components have been mixed, the soluions can be cooled to room temperatures and stored for future use, if desired, or used immediately.

Acidic and basic catalysts can be added, if desired, to speed the rate of cure. Catalysts in amounts ranging up to 5.0 weight percent based on the total weight of dicyclopentadiene dioxide and polyglycidyl ether can be added at this point, at any time prior to curing or not all, as desired. Higher catalyst concentrations above this range are also effective, although concentrations of 5.0 weight percent and below have been found to be adequate. Catalyst concentrations of 0.01 to 5.0 weight percent based on the total weight of dicyclopentadiene dioxide and polyglycidyl ether are particularly preferred. Other polyfunctional materials also may be incorporated into our curable compositions.

Curing can be carried out by maintaining the curable compositions at temperatures from 50° C. to 250° C. Temperatures higher than 250° C. can be used, although some discoloration which may not be desired in the resin may result. The time for effecting a complete cure can be varied from several minutes to several hours.

It has been found that those compositions which contain difunctional polycarboxylic acid anhydrides, i.e., anhydrides having two carboxy equivalents, and difunctional polyols, i.e., polyols having two hydroxyl equivalents tend to form more flexible resins when cured than compositions containing anhydrides and polyols of greater functionality. Compositions which contain anhydrides having greater numbers of interconnected atoms in the shortest chain between the carbonyl carbons of the oxidicarboxyl group of the anhydride, e.g., adipic anhydrides, are believed to form softer, more flexible resins than corresponding compositions containing anhydrides of the same functionality but which have fewer interconnected atoms in the shortest carbon chain between carbonyl carbons of the oxidicarbonyl group thereof, e.g., maleic anhydride. Similarly, softer more flexible resins can be made from compositions which contain polyols having greater numbers of interconnected atoms in the shortest chain between the hydroxyl groups of the polyol, e.g., polyethylene glycol, average molecular weight of 200, than resins made from corresponding compositions containing polyols of the same functionality but which have fewer interconnected atoms in the shortest chain between the hydroxyl groups thereof, e.g. ethylene glycol. The hardness and rigidity of resins formed from our compositions can be controlled also by the use of different relative amounts of dicyclopentadiene dioxide, polyglycidyl ether, anhydride and polyol in said compositions. We have found that higher concentrations of carboxy equivalents and lower concentrations of hydroxy equivalents lead to harder, more highly cross-linked resins of higher heat distortion values and, conversely, lower concentrations of carboxy equivalents and higher concentrations of hydroxy equivalents lead to softer, more flexible resins of lower heat distortion values. It was also discovered that the higher concentrations of carboxyl groups increased the curing rate. Thus, resins having a wide range of properties can be produced.

Infusible resins which are water-resistant and insoluble in many organic solvents can be made from our curable compositions. Illustratively, such resins can be made from compositions which contain dicyclopentadiene dioxide, polyglycidyl ethers of polyhydric phenols, polycarboxylic acid anhydrides, in such amounts as to provide about 0.16 to 5.0 carboxy equivalents of the anhydride for each epoxy equivalent of the diepoxide and polyglycidyl ether; and polyols in such amounts as to provide up to about 2.0 hydroxyl equivalents of the polyol for each epoxy equivalent of the diepoxide and polyglycidyl ether. Hard, infusible resins having high heat distortion values and which are also water-resistant and insoluble in most organic solvents also can be made from our curable compositions. Illustratively, hard, high heat distortion resins of this type can be prepared from compositions which contain dicyclopentadiene dioxide, polyglycidyl ethers of polyhydric phenols, polycarboxylic acid anhydrides, in such amounts as to provide about 0.33 to 4.0 carboxy equivalents of the anhydride for each epoxy equivalent of the diepoxide and polyglycidyl ether, and polyols in such amounts as to provide about 0.08 to 2.0, more preferably 0.16 to 2.0, hydroxyl equivalents of the polyol for each epoxy equivalent of the diepoxide and polyglycidyl ether. The total weight of the epoxide component, that is, the dicyclopentadiene dioxide and the polyglycidyl ether of a polyhydric phenol, can be comprised of from about 1 to about 99 weight percent of dicyclopentadiene dioxide. More preferably, the epoxide component of the novel curable compositions of this invention can be comprised of from about 5 to about 95 weight percent of dicyclopentadiene dioxide, and from about 95 to about 5 weight percent of the polyglycidyl ether.

By the term "polyol," as used herein, is meant an organic compound having at least two hydroxyl groups which are alcoholic hydroxyl groups, phenolic hydroxyl groups or both alcoholic and phenolic hydroxyl groups. Typical polyols can be represented by the general formula:

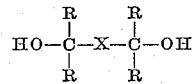

wherein R can be an alkyl group or hydrogen and can be the same or different for all R's in the molecule. X can be a single bond or a divalent group composed of a carbon atom or group of carbon atoms interconnected by single or multiple bonds and to which such groups as hydrogen, alkyl, hydroxyl, carboxyl, amino, cyclic groups and the like or combinations thereof can be attached. X can also represent such divalent groups as oxyalkylene or polyoxyalkylene groups. X, as a divalent group may also contain nitrogen to which other groups, for example, hydrogen, alkyl, alkanol and the like may be attached or it may represent a carbon atom group which contains sulfur. It can also represent cyclic groups, such as phenylene, cyclohexylene and the like. The R's and X together with the carbon atoms, i.e., the C's of the formula, can represent a cyclic group such as phenylene, cyclohexylene and the like. The presence of other groups, with the exception of tautomeric enolic groups, not specifically listed herein and not participating in the curing reaction is by no means harmful and, in fact, can be useful in developing special properties in our resins. Mixtures of polyols or only one polyol can be employed in our curable compositions.

Representative polyols which can be employed in our compositions are polyhydric alcohols, such as, ethylene glycol, diethylene glycol, polyethylene glycols, propylene glycol, tripropylene glycol, polypropylene glycols, polyethylenepolypropylene glycols, trimethylene glycol, butanediols, pentanediols, 2-ethyl-1,3-hexanediol, 2-methyl-2,4-pentanediol, 12,13-tetracosanediol, 2-butene-1,4-diol, 2-methoxymethyl-2,4-dimethyl - 1,5 - pentanediol, diethanolamine, triethanolamine, glycerol, polyglycerols, pentaerythritol, sorbitol, polyvinyl alcohols, cyclohexanediols, cyclopentanediols, inositol, trimethylolphenol, 2,4,6-trimethylolphenyl allyl ether, and polyhydric phenols, such as, dihydroxytoluenes, resorcinol, bisphenol A, i.e., bis(4-hydroxyphenyl) - 2,2 - propane, bis(4 - hydroxyphenyl) methane, the polyhydric phenolicformaldehyde condensation products, and the like. Polyols which are free of acetylenic unsaturation and composed of carbon, hydrogen and oxygen combined as hydroxyl oxygen or ether oxygen connecting two otherwise unconnected carbon atoms and having not more than 60 carbon atoms are preferred.

Polycarboxylic acid anhydrides useful in producing our resins can be represented by the formula:

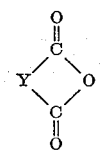

wherein Y represents two or more carbon atoms interconnected by single or double bonds and to which such groups as hydrogen, alkyl, nitro, chloro, iodo, bromo, cyclic groups and the like or combinations thereof may be attached. Y can also represent groups containing carbon atoms interconnected by single or double bonds and oxydicarboxyl groups, i.e.,

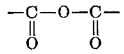

interconnecting the carbon atom groups to which such other groups as previously mentioned may be attached. Y may also represent such cyclic groups as phenylene, cyclohexylene, cyclohexenylene, and the like which may have one or more oxydicarbonyl groups attached thereto. Polycarboxylic acid anhydrides, containing other groups not specifically mentioned herein, and not taking part in the curing reaction can be used in our curable compositions without harmful effects, and, in fact, can be used to develop particular properties in our resins. One polycarboxylic acid anhydride or a mixture of two or more, as desired, can be used in our curable compositions. Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride, hexachloroendomethylenetetrahydrophthalic anhydride, hereinafter referred to as chlorendic anhydride, tetrabromophthalic anhydride, tetraiodophthalic anhydride, phthalic anhydride, 4-nitrophthalic anhydride, 1,2-naphthalic anhydride, 1,8-naphthalic anhydride, 2,3-naphthalic anhydride, 1,2,4,5-benzenetetracarboxylic dianhydride, polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our curable compositions include the Diels-Alder adducts of maleic acid and aliphatic compounds having conjugated double bonds. Preferred polycarboxylic acid anhydrides are those which are soluble in dicyclopentadiene dioxide at temperatures below about 200° C.

The polyglycidyl ethers of polyhydric phenols which can be employed in the present invention are those polyepoxide compounds having terminal epoxy groups, one or more aromatic nucleus, or nuclei, including fused aromatic nuclei, and at least two aliphatic groups including terminal epoxy-containing aliphatic groups, the aliphatic groups being attached to the aromatic nuclei through carbon to oxygen to carbon linkages.

Included among the polyglycidyl ethers of polyhydric phenols are those compounds represented by the formula:

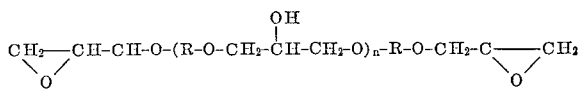

wherein R is a divalent hydrocarbon radical of a dihydric phenol and n has a value of 0, 1, 2, 3, etc., up to about 50. The polyglycidyl ethers of polyhydric phenols are prepared by reacting a polyhydric phenol with epichlorohydrin in an alkaline medium.

Suitable polyglycidyl ethers of polyhydric phenols include, among others, the glycidyl ethers of mononuclear polyhydric phenols such as, for example, resorcinol, catechol, hydroquinone, phloroglycinol and the like. Also included are the glycidyl ethers of polynuclear polyhydric phenols such as, p,p'-dihydroxydibenzyl, p,p'-biphenol, p,p'-dihydroxybenzophenone, 2,2'-dihydroxy-1,1'-dinaphthylmethane, and the 2,2'; 2,3'; 2,4'; 3,3'; 3,4'; and 4,4'-isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, and the like. Preferred polyglycidyl polyethers are those which contain as reactive groups only epoxy groups and hydroxyl groups and which have epoxide equivalent weights of from about 100 to about 5,000, and more preferably from about 160 to about 1,500.

Dicyclopentadiene dioxide is a solid having the formula:

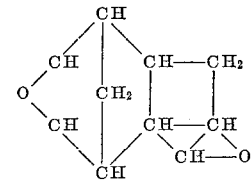

The diepoxide can be prepared by the epoxidation of the olefinic double bonds of dicyclopentadiene employing suitable epoxidizing agents.

Suitable epoxidizing agents for the epoxidation reaction include peracetic acid and acetaldehyde monoperacetate. The epoxidation reaction can be advantageously carried out by charging dicyclopentadiene to a reaction vessel and then gradually adding the epoxidizing agent. In order to provide ease of handling and to avoid the formation of highly concentrated or crystalline peracetic acid with its attendant explosion hazard, the epoxidizing agent preferably is employed in a solvent, as for example, acetone, chloroform, methylethyl ketone, ethyl acetate, butyl acetate, and the like. The reaction can be carried out at a temperature within the range of about −25° C. to 150° C., although lower and higher temperatures may be used. However, longer reaction times are needed at the lower temperatures to produce high yields. At the higher temperatures, side reactions form undesirable materials which can be removed, however, by conventional purification procedures, such as, fractional distillation. The reaction is continued until an analysis for epoxidizing agent indicates that an amount at least sufficient to epoxidize all the double bonds of dicyclopentadiene has been consumed. In this connection it is desirable to employ an excess over the theoretical amounts of peracetic acid to assure complete epoxidation. Upon discontinuance of the reaction, side-reaction products, solvent and unreacted material are removed by any convenient procedure, such as, by adding a potboiler, e.g., ethylbenzene, and stripping low-boiling materials. A solid material, identified as dicyclopentadiene dioxide, is obtained. Dicyclopentadiene dioxide can be accepted as a residue product and subsequently further refined by distillation, extraction or crystallization, if desired.

Catalysts which can be employed with advantageous effects in accelerating the cure of our compositions are the basic and acidic catalysts including strong alkalis, mineral acids and metal halide Lewis acids. Typical strong alkalis include the alkali metal hydroxides, e.g., sodium hydroxide and potassium hydroxide, and quaternary ammonium compounds, e.g., benzoyltrimethylammonium hydroxide, tetramethylammonium hydroxide and the like; and tertiary amines, e.g., benzyldimethyl amine, dimethylaminomethylphenol, 2,4,6-tris(dimethylaminoethyl) phenol and the like. Representative of mineral acids which can be used in speeding the formation of our resins are sulfuric acid, perchloric acid, polyphosphoric acid and the various sulfonic acids, such as, toluene sulfonic acid, benzene sulfonic acid and the like. Metal halide Lewis acids which are also effective in speeding the cure of our resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in our compositions prior to curing has been found to be desirable in order to obtain homogeneous resins and to minimize localized curing around catalyst particles. Agitation of the compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methylisobutylketone, cyclohexanone, organic alcohols, e.g., methanol, cyclohexanol, propylene glycol and the like. The mineral acids and strong alkalis can be employed as solutions in water, whereas metal halide Lewis acid catalysts tend to decompose in water and aqueous solutions of such Lewis acids are not preferred.

Our curable compositions can be used in coatings, castings, moldings, bondings, laminates and the like in the manufacture of articles having a multitude of uses. These compositions can be colored by pigments and very appealing appearances may be imparted to articles made therefrom. Fillers can also be incorporated in our compositions so as to impart special properties to articles manufactured therefrom. Such sundry articles as buttons, combs, brush handles, structural parts for instrument cabinets and the like can be formed through the use of our curable compositions and resins. Of particular importance, are uses of our hard, tough resins of high heat distortion values in industrial applications wherein load carrying capabilities at high temperatures are required. Uses of this kind include hot fluid carrying conduits, high temperature tools and dies, minor structural parts and high temperature electrical insulation for high-speed aircraft and the like.

The following examples are presented. In these examples "parts" designates parts by weight. Barcol hardness values were determined through the use of a Barcol Impressor GYZJ 934–1. Unless otherwise specified, room temperatures are temperatures in the 20° C. to 30° C. range.

EXAMPLE 1

A mixture was prepared containing 28.0 weight percent, based on the total mixture, of dicyclopentadiene dioxide, 28.0 weight percent of a commercial epoxy compound, ERL–2774, which is a diglycidyl ether of bisphenol A having an epoxide equivalent weight of 198, 41.05 weight percent of phthalic anhydride, 2.95 weight percent of glycerol, and 0.5 weight percent of benzyldimethylamine. The amounts of reactants contained in the mixture were such as to provide 0.8 carboxyl equivalent per epoxy equivalent from the dicyclopentadiene dioxide, 2.0 carboxyl equivalents per epoxy equivalent from the diglycidyl ether, and 0.2 hydroxyl equivalent per epoxy equivalent. A resin plaque, weighing 15 grams, was prepared by heating the mixture to 100° C. and curing the resulting homogeneous solution in a circulating-air oven for 2 hours at 120° C. and 3 hours at 160° C. The resin was a dark yellow solid and had a Barcol hardness of 50.

EXAMPLE 2

A mixture was prepared containing 24.0 weight percent, based on the total mixture, of dicyclopentadiene dioxide, 24.0 weight percent of a commercial epoxy compound, ERL–2774, which is a diglycidyl ether of bisphenol A having an epoxide equivalent weight of 198, 42.6 weight percent of a methylated cyclopentadiene adduct of maleic anhydride, a methylated maleic adduct of phthalic anhydride, 9.4 weight percent of bisphenol A, and 0.5 weight percent of benzyldimethylamine. The amounts of reactants contained in the mixture were such as to provide 0.8 carboxyl equivalent per epoxy equivalent from the dicyclopentadiene dioxide, 2.0 carboxyl equivalents per epoxy equivalent from the diglycidyl ether, and 0.2 hydroxyl equivalent per epoxy equivalent. A resin plaque, weighing 15 grams, was prepared by heating the mixture to 100° C. and curing the resulting homogeneous solution in a circulating-air oven for 2 hours at 120° C. and 3 hours at 160° C. The resin was a flexible yellow solid and had a Barcol hardness of 0.

EXAMPLE 3

A mixture was prepared containing 31.8 weight percent, based on the total mixture, of dicyclopentadiene dioxide, 31.8 weight percent of a commercial epoxy compound, ERL–2774, which is a diglycidyl ether of bisphenol A having an epoxide equivalent weight of 198, 31.5 weight percent of succinic anhydride, 4.9 weight percent of 1,2,6-hexanetriol, and 0.5 weight percent of benzyldimethylamine. The amounts of reactants contained in the mixture were such as to provide 0.8 carboxyl equivalent per epoxy equivalent from the dicyclopentadiene dioxide, 2.0 carboxyl equivalents per epoxy equivalent from the diglycidyl ether, and 0.2 hydroxyl equivalent per epoxy equivalent. A resin plaque, weighing 15 grams, was prepared by heating the mixture to 100° C. and curing the resulting homogeneous solution in a circulating-air oven for 2 hours at 120° C. and 3 hours at 160° C. The resin was a tough, rigid, yellow solid.

EXAMPLE 4

A mixture was prepared containing 23.1 weight percent, based on the total mixture, of dicyclopentadiene dioxide, 23.1 weight percent of a commercial epoxy compound, ERL–2774, which is a diglycidyl ether of bisphenol A having an epoxide equivalent weight of 198, 34.8 weight percent of tetrahydrophthalic anhydride, 14.0 weight percent of a commercial polyol, Niax triol LHT–240,[2] which has a molecular weight of 700, and 0.5 weight percent of benzyldimethylamine. The amounts of reactants contained in the mixture were such as to provide 0.8 carboxyl equivalent per epoxy equivalent from the dicyclopentadiene dioxide, 2.0 carboxyl equivalents per epoxy equivalent from the diglycidyl ether, and 0.2 hydroxyl equivalent per epoxy equivalent. A resin plaque, weighing 15 grams, was prepared by heating the mixture to 100° C. and curing the resulting homogeneous solution in a circulating-air oven for 2 hours at 120° C. and 3 hours at 160° C. The resin was a light yellow, flexible, tough solid.

EXAMPLE 5

A mixture was prepared containing 35.65 weight percent, based on the total mixture, of dicyclopentadiene dioxide, 35.65 weight percent of a commercial epoxy compound, Epon 1001, a diglycidyl ether of bisphenol A having an epoxide equivalent weight of 490, 24.2 weight percent of maleic anhydride, and 4.5 weight percent of trimethylolpropane. The amounts of reactants contained

---

[2] An adduct of approximately 9 moles of propylene oxide and 1 mole of 1,2,6-hexanetriol.

in the mixture were such as to provide 0.8 carboxyl equivalent per epoxy equivalent from the dicyclopentadiene dioxide, 2.0 carboxyl equivalents per epoxy equivalent from the diglycidyl ether, and 0.2 hydroxyl equivalent per epoxy equivalent. A resin plaque, weighing 15 grams, was prepared by heating the mixture to 100° C. and curing the resulting homogeneous solution in a circulating-air oven for 2 hours at 120° C. and 3 hours at 160° C. A rigid, light yellow resin was obtained which had a Barcol hardness of 52.

EXAMPLE 6

A mixture was prepared containing 37.05 weight percent, based on the total mixture, of dicyclopentadiene dioxide, 37.05 weight percent of a commercial epoxy compound Epon 1004, a diglycidyl ether of bisphenol A having an epoxide equivalent weight of 950, 21.5 weight percent of maleic anhydride, and 4.4 weight percent of trimethylolpropane. The amounts of reactants contained in the mixture were such as to provide 0.8 carboxyl equivalent per epoxy equivalent from the dicyclopentadiene dioxide, 2.0 carboxyl equivalents per epoxy equivalent from the diglycidyl ether, and 0.2 hydroxyl equivalent per epoxy equivalent. A resin plaque, weighing 15 grams, was prepared by heating the mixture to 100° C. and curing the resulting homogeneous solution in a circulating-air oven for 2 hours at 120° C. and 3 hours at 160° C. A rigid, light yellow resin was obtained which had a Barcol hardness of 48.

EXAMPLE 7

A mixture was prepared containing 32.3 weight percent, based on the total mixture, of dicyclopentadiene dioxide, 32.3 weight percent of a commercial epoxy compound, Epon 1031, a polyglycidyl ether of a polyhydric phenol having an epoxide equivalent weight of 210, 30.5 weight percent of maleic anhydride and 4.9 weight percent of trimethylolpropane. The amounts of reactants contained in the mixture were such as to provide 0.8 carboxyl equivalent per epoxy equivalent from the dicyclopentadiene dioxide, 2.0 carboxyl equivalents per epoxy equivalents from the diglycidyl ether, and 0.2 hydroxyl equivalents per epoxy equivalent. A resin plaque, weighing 15 grams, was prepared by heating the mixture to 100° C. and curing the resulting homogeneous solution in a circulating-air oven for 2 hours at 120° C. and 3 hours at 160° C. A rigid, yellow resin having a Barcol hardness of 65 was obtained.

EXAMPLE 8

A mixture was prepared containing 56.7 weight percent, based on the total mixture, of dicyclopentadiene dioxide, 6.3 weight percent of a commercial epoxy compound, DER-332, a diglycidyl ether of bisphenol A having an epoxide equivalent weight of 179, 30.5 weight percent of maleic anhydride and 6.5 weight percent of trimethylolpropane. The amounts of reactants contained in the mixture were such as to provide 0.8 carboxyl equivalent per epoxy equivalent from the dicyclopentadiene dioxide, 2.0 carboxyl equivalents per epoxy equivalent from the diglycidyl ether, and 0.2 hydroxyl equivalent per epoxy equivalent. A resin plaque, weighing 15 grams, was prepared by heating the mixture to 100° C. and curing the resulting homogeneous solution in a circulating-air oven for 2 hours at 120° C. and 3 hours at 160° C. The resin obtained was a light yellow, rigid solid, free of air bubbles and had a Barcol hardness of 60.

EXAMPLE 9

In order to demonstrate the effect of omitting the polyol component from the curable compositions, a mixture was prepared containing 60.6 weight percent, based on the total mixture, of dicyclopentadiene dioxide, 6.7 weight percent of a commercial epoxy compound, DER-332, a diglycidyl ether of bisphenol A having an epoxide equivalent weight of 179, and 32.7 weight percent of maleic anhydride. The amounts of reactants contained in the mixture were such as to provide 0.8 carboxyl equivalent per epoxy equivalent from the dicyclopentadiene dioxide and 2.0 carboxyl equivalents per epoxy equivalent from the diglycidyl ether. A resin plaque, weighing 15 grams, was prepared by heating the mixture to 100° C. and curing the resulting homogeneous solution in a circulating-air oven for 2 hours at 120° C. and 3 hours at 160° C. The resulting resin was a rigid, brown, crazed solid which was full of air bubbles.

EXAMPLE 10

In order to demonstrate the effect of omitting the anhydride component from the curable compositions, a mixture was prepared containing 81.6 weight percent, based on the total mixture, of dicyclopentadiene dioxide, 9.05 weight percent of a commercial epoxy compound, DER-332, a diglycidyl ether of bisphenol A having an epoxide equivalent weight of 179, and 9.35 weight percent of trimethylolpropane. The amounts of reactants contained in the mixture were such as to provide 0.2 hydroxyl equivalent per epoxy equivalent. Upon heating the mixture was found that the formulation would not even form a homogeneous solution, even when held at 130° C. for a prolonged period of time. It was thus not possible to form a resin by the usual techniques.

EXAMPLE 11

In order to further demonstrate the effect of omitting the anhydride component from the formulation and increasing the hydroxyl equivalents, a mixture was prepared containing 68.8 weight percent based on the total mixture of dicyclopentadiene dioxide, 7.6 weight percent of a commercial epoxy compound, DER-332, a diglycidyl ether of bisphenol A having an epoxide equivalent weight of 179, and 23.6 weight percent of trimethylolpropane. The amount of reactants contained in the mixture were such as to provide 0.6 hydroxyl equivalent per epoxy equivalent. Upon heating the mixture it was found that the formulation would not even form a homogeneous solution, even when held at 130° C. for a prolonged period of time. It was thus not possible to form a resin in spite of the increase in hydroxyl equivalent.

EXAMPLES 12–18

A mixture was prepared containing 71.9 weight percent, based on the total mixture, of a commercial epoxy compound ERL-2774, which is a diglycidyl ether of bispheonl A having an epoxide equivalent weight of 198, 24.9 weight percent of maleic anhydride, and 3.2 weight percent of 1,1,1-trimethylolpropane. The amounts of reactants contained in the mixture were such as to provide 1.4 carboxyl equivalent and 0.2 hydroxyl equivalent per epoxy equivalent from the ERL-2774. The mixture was cured in bar molds for 9 hours at 120° C., 6 hours at 160° C., and 6 hours at 200° C. Thereafter, resin specimens were aged for 24 hours at 230° C. and 260° C. to determine thermal stability.

Similar resin specimens were prepared, but in addition to the ERL-2774, they contained dicyclopentadiene dioxide in the weight percents indicated in Table I. The carboxyl content was based on 0.8 carboxyl group per epoxide group from the dicyclopentadiene dioxide, and 1.4 carboxyl groups per epoxide group from the commercial epoxy compound. The resins were cured for 2 hours at 120° C., 6 hours at 160° C., 6 hours at 200° C. and 6 hours at 260° C. Thereafter, the resin specimens were aged for 24 hours at 260° C. to determine weight loss.

Table I, which follows, sets forth the comparative data of heat distortion temperatures and weight loss for each of the resins prepared. The heat distortion values were determined by the ASTM method of D-648-45T and are recorded as degrees centigrade under a 264 pounds per square inch load.

*Table I*

| Example | Dicyclopentadiene Dioxide [1] | Heat Distortion | | Percent Weight Loss |
|---|---|---|---|---|
| | | 200° | 260° | |
| 12 | 0 | 126 | 182 | 3.9 |
| 13 | 5 | 142 | 270 | 2.7 |
| 14 | 25 | 192 | 295 | 3.2 |
| 15 | 50 | 203 | 285 | 3.3 |
| 16 | 75 | 232 | >300 | 3.5 |
| 17 | 95 | 191 | >300 | 3.7 |
| 18 | 100 | 240 | 294 | 2.6 |

[1] In weight percent based on total weight of epoxide.

It was thus evident from the foregoing comparative data, that the use of dicyclopentadiene dioxide gave resins having increased heat distortion temperatures and better thermal stability, relative to the glycidyl ether resins.

Although the invention has been illustrated by the preceding examples, the invention is not to be construed as limited to the materials therein, but rather, the invention encompasses the generic area as hereinbefore disclosed. Various modifications and embodiments of this invention can be made without departing from the spirit and scope thereof.

What is claimed is:

1. A curable composition comprising dicyclopentadiene dioxide, a polyglycidyl ether of a polyhydric phenol, a polycarboxylic acid anhydride and an organic polyol, in such relative amounts as to provide from about 0.16 to 5.0 carboxy equivalents of said anhydride and up to 2.0 hydroxyl equivalents of said polyol for each epoxy equivalent of said dicyclopentadiene dioxide and said polyglycidyl ether, and wherein the total weight of said dicyclopentadiene dioxide and said polyglycidyl ether is comprised of from about 5 to about 95 weight percent of said dicyclopentadiene dioxide and from about 95 to about 5 weight percent of said polyglycidyl ether.

2. A solid resin obtained by heating the curable composition defined in claim 1.

3. A curable composition comprising dicyclopentadiene dioxide, a diglycidyl ether of bisphenol A having an epoxide equivalent weight of from about 160 to about 1500, phthalic anhydride and an organic polyol, in such relative amounts as to provide from about 0.33 to 4.0 carboxy equivalents of said anhydride and from about 0.08 to 2.0 hydroxyl equivalents of said polyol for each epoxy equivalent of said dicyclopentadiene dioxide and said diglycidyl ether, and wherein the total weight of said dicyclopentadiene dioxide and said diglycidyl ether is comprised of from about 5 to about 95 weight percent of said dicyclopentadiene dioxide and from about 95 to about 5 weight percent of said diglycidyl ether.

4. A solid resin obtained by heating the curable composition defined in claim 3.

5. A curable composition comprising dicyclopentadiene dioxide, a diglycidyl ether of bisphenol A having an epoxide equivalent weight of from about 160 to about 1500, a methylated cyclopentadiene adduct of maleic anhydride, and bisphenol A, in such relative amounts as to provide from about 0.33 to 4.0 carboxy equivalents of said anhydride and from about 0.08 to 2.0 hydroxyl equivalents of said bisphenol A for each epoxy equivalent of said dicyclopentadiene dioxide and said diglycidyl ether, and wherein the total weight of said dicyclopentadiene dioxide and said diglycidyl ether is comprised of from about 5 to about 95 weight percent of said dicyclopentadiene dioxide and from about 95 to about 5 weight percent of said diglycidyl ether.

6. A solid resin obtained by heating the curable composition defined in claim 5.

7. A curable composition comprising dicyclopentadiene dioxide, a diglycidyl ether of bisphenol A having an epoxide equivalent weight of from about 160 to about 1500, succinic anhydride, and an organic polyol, in such relative amounts as to provide from about 0.33 to 4.0 carboxy equivalents of said anhydride and from about 0.08 to 2.0 hydroxyl equivalents of said polyol for each epoxy equivalent of said dicyclopentadiene dioxide and said diglycidyl ether, and wherein the total weight of said dicyclopentadiene dioxide and said diglycidyl ether is comprised of from about 5 to about 95 weight percent of said dicyclopentadiene dioxide and from about 95 to about 5 weight percent of said diglycidal ether.

8. A solid resin obtained by heating the curable composition defined in claim 7.

9. A curable composition comprising dicyclopentadiene dioxide, a diglycidal ether of bisphenol A having an epoxide equivalent weight of from about 160 to about 1500, maleic anhydride, and an organic polyol in such relative amounts as to provide from about 0.33 to 4.0 carboxy equivalents of said anhydride and from about 0.08 to 2.0 hydroxyl equivalents of said polyol for each epoxy equivalent of said dicyclopentadiene dioxide and said diglycidal ether, and wherein the total weight of said dicyclopentadiene dioxide and said diglycidyl ether is comprised of from about 5 to about 95 weight percent of said dicyclopentadiene dioxide and from about 95 to about 5 weight percent of said diglycidyl ether.

10. A solid resin obtained by heating the curable composition defined in claim 9.

11. A curable composition comprising dicyclopentadiene dioxide, a diglycidyl ether of bisphenol A having an epoxide equivalent weight of from about 160 to about 1500, maleic anhydride, and trimethylolpropane, in such relative amounts as to provide from about 0.33 to 4.0 carboxy equivalents of said anhydride and from about 0.08 to 2.0 hydroxyl equivalents of said trimethylolpropane for each epoxy equivalent of said dicyclopentadiene dioxide and said diglycidyl ether, and wherein the total weight of said dicyclopentadiene dioxide and said diglycidyl ether is comprised of from about 5 to about 95 weight percent of said dicyclopentadiene dioxide and from about 95 to about 5 weight percent of said diglycidyl ether.

12. A solid resin obtained by heating the curable composition defined in claim 11.

13. A curable composition comprising dicyclopentadiene dioxide, a polyglycidyl ether of a polyhydric phenol having an epoxide equivalent weight of 210, maleic anhydride, and trimethylolpropane, in such relative amounts as to provide from about 0.33 to 4.0 carboxy equivalents of said anhydride and from about 0.08 2.0 hydroxyl equivalents of said trimethylolpropane for each epoxy equivalent of said dicyclopentadiene dioxide and said polyglycidyl ether, and wherein the total weight of said dicyclopentadiene dioxide and polyglycidyl ether is comprised of from about 5 to about 95 weight percent of said dicyclopentadiene dioxide and from about 95 to about 5 weight percent of said polyglycidyl ether.

14. A solid resin obtained by heating the curable composition as defined in claim 13.

15. A curable composition comprising dicyclopentadiene dioxide, a diglycidyl ether of bisphenol A having an epoxide equivalent weight of 179, maleic anhydride, and trimethylolpropane, in such relative amounts as to provide from about 0.33 to 4.0 carboxy equivalents of said anhydride and from about 0.08 to 2.0 hydroxyl equivalents of said trimethylolpropane for each epoxy equivalent of said dicyclopentadiene dioxide and said diglycidyl ether, and wherein the total weight of said dicyclopentadiene dioxide and said diglycidyl ether is comprised of from about 5 to about 95 weight percent of said dicyclopentadiene dioxide and from about 95 to about 5 weight percent of said diglycidyl ether.

16. A solid resin obtained by heating the curable composition defined in claim 15.

References Cited by the Examiner

UNITED STATES PATENTS

| | | | |
|---|---|---|---|
| 2,830,031 | 4/1958 | Fisch | 260—835 |
| 2,934,521 | 4/1960 | Masters et al. | 260—835 |
| 2,947,717 | 8/1960 | Belanger et al. | 260—835 |
| 2,985,616 | 5/1961 | McGary et al. | 260—75 |

WILLIAM H. SHORT, *Primary Examiner.*